United States Patent [19]
Decker

[11] Patent Number: 6,136,219
[45] Date of Patent: Oct. 24, 2000

[54] COMPOSITION FOR WATER CLARIFICATION

[76] Inventor: Stephen W. Decker, W9279 Ripley Rd., Cambridge, Wis. 53523

[21] Appl. No.: 09/346,433

[22] Filed: Jul. 1, 1999

[51] Int. Cl.$^7$ ................................ C02F 5/08; C02F 5/10; A61L 11/00
[52] U.S. Cl. ........................ 252/180; 252/175; 252/178; 252/181; 424/76.5
[58] Field of Search .................................. 252/180, 175, 252/178, 181; 424/76.5

[56] References Cited

U.S. PATENT DOCUMENTS

| | | | |
|---|---|---|---|
| 3,852,213 | 12/1974 | Cooney | 252/181 |
| 4,565,635 | 1/1986 | Le Du et al. | 210/727 |
| 4,713,195 | 12/1987 | Schneider | 252/180 |
| 4,895,658 | 1/1990 | Amjad | 210/636 |
| 5,149,643 | 9/1992 | Mothes et al. | 435/144 |
| 5,453,200 | 9/1995 | Weiss et al. | 210/639 |
| 5,683,587 | 11/1997 | Ferrara et al. | 210/696 |
| 5,736,032 | 4/1998 | Cox et al. | 424/76.5 |

*Primary Examiner*—Jill Warden
*Assistant Examiner*—LaToya Cross
*Attorney, Agent, or Firm*—Kajane McManns

[57] ABSTRACT

The composition for clarifying a body of water comprises at least an anionic polyacrylamide, aluminum chloral hydrate or aluminum oxide and citric acid combined in amounts sufficient to produce a clarification of a body of water. If necessary, calcium carbonate or calcium sulfate may be included in the composition to neutralize pH in acidic environments for increased effectivity.

4 Claims, No Drawings

COMPOSITION FOR WATER CLARIFICATION

BACKGROUND OF THE INVENTION

1. Field of the Invention

The present invention relates to a composition for the clarification of bodies of water such as ponds and lakes.

2. Prior Art

Heretofore various compositions and products have been proposed for use in clarifying bodies of water such as ponds and lakes.

Most such compositions are toxic, disturbing natural flora and fauna, upsetting ecological balance, and potentially leading to demise of the aquatic ecosystem.

Further, such compositions are typically selective for use in a specific bottom soil type environment such as for silt only, clay only, sand only, etc.

Also, previously proposed compositions have lacked an adequate degree of solubility requiring use of excessive amounts to achieve desired levels of the composition in water systems.

Therefore, there has been defined a need for a water clarification composition which has virtually no toxic effect, is enhanced in its solubility in water and which is suitable for use in a wide range of bottom soil type environments in decreased amount due to enhanced solubility thereof.

SUMMARY OF THE INVENTION

Accordingly, it is a primary object of the invention to provide a composition for clarification of a body of water which is not only substantially nontoxic to the environment of use but which is also applicable for use in a multitude of bottom soil type environments.

This object as well as others is met by the composition of the present invention which includes at least an anionic polyacrylamide, either aluminum chloral hydrate or aluminum oxide and citric acid sufficient to produce solubility of the composition in water. If the environment of use requires pH balancing, calcium carbonate or calcium sulfate may be added to the composition for effective neutralization.

DESCRIPTION OF THE PREFERRED EMBODIMENTS

The composition or product to be disclosed hereinafter is a polyacrylamide (hereinafter PAM) based chemical compound designed for use in clarifying a body of water such as a pond or lake. The use of PAM with a high molecular weight in such application is revolutionary, inasmuch as not all PAM polymers are equally effective. Hundreds of polymers were tested and none surpassed the particular PAM utilized herein for its superior performance.

The particular PAM used in this composition has more than 100,000 monomer units per molecule and is moderately anionic (18% active sites). Thus the PAM has a high molecular weight and is electrically charged to attract soil particles. The PAM clumps together silts and clays (generally particles less than 20 microns) and prevents them from becoming detached and remaining suspended in water.

As an example, the soils of southern Wisconsin are composed of fine particles with 60–90% of the particles having a size of less than 20 microns. It is easy to see, therefore, that the use of a composition incorporating PAM will produce the desired clarification and make the maintenance of sediment control structures significantly less costly due to its efficiency and low cost.

With respect to use of PAM as a main component of the composition, fine particles remain suspended for long periods of time in rainwater runoff. The use of detention basins and settling ponds is common on large construction sites in order to mitigate the problems sediment laden water causes to downstream waterways. Because it takes approximately 84 hours for a 1 micron particle to settle 1 foot in still water, detention and settling ponds must be extremely large to effectively rid water of solids suspended therein.

Once clay or silt enters a water environment, a cloud or halo of charges is created, surrounding each soil particle. Water is $H_2O$, and therefore has a charge of 2 positives (H) to each negative (O). This polarized character of water in and of itself causes soil and clay particles to remain in suspension therein and the diffused electrical cloud surrounding the particles is what the composition of the present invention overcomes by disruption thereof.

In this application, PAM acts as a chemical anionic binder. In this respect, PAM is a long chain carbon molecule. The long chain of carbon atoms attaches to positively charged edges of the clay and silt. The acrylamide molecule bonds to the clay or silt because the polymer has many unbound negative charges left after initial attachment, continuously searching for the few positive charges that are inherently part of the clay or silt. With the introduction of such high molecular weight PAM, the clarity of water can be greatly improved. Application of the composition of the present invention to settling ponds will allow a 1 micron particle to settle in minutes. Additionally, the composition will prevent the bottom of the pond from clogging with fine particles, and therefore will allow continued infiltration of water into the ground, reducing maintenance needs of the pond.

Thus it will be understood that PAM is a low cost, highly effective tool for reducing suspended sediment.

A second required component is selected from aluminum chloral hydrate or aluminum oxide, each of which cross links the polymer, creating a coagulant. The chemical bridge produced is stronger than the bond between the soil and polymer alone, creating larger soil clumps, providing maximized flocculation. Now thousands of soil particles become attached in chain like fashion, are insoluble in the environment, and fall to the bottom of the pond.

Turning now to the final required component of the composition, citric acid, it will be understood that the citric acid acts as a vehicle or dispersant, producing an increased solubility of the composition which is typically in a powder form and substantially insoluble in water unless mechanically mixed therein over extended periods of time to obtain a workable solution thereof.

Obviously, this lack of solubility must be overcome for use of the composition in large bodies of water where such mixing cannot take place. The addition of a small amount of citric acid to the composition avoids the need for mixing, making the composition well suited for use in the particular application presented herein.

An ancillary component which is required for effectivity of the composition in an environment requiring pH balancing toward neutral is lime which may be in either of two similar forms, both of which are calcium based.

The first form is calcium sulfate, more commonly referred to as Gypsum, and the second form is calcium carbonate.

Both forms act in a similar manner in the composition, amending alkalinity and acidity of the environment toward a neutral point. The positively charged calcium bonds to the negatively (anionic) charged chain of polymer PAM to create a positive (cationic) chain which then attaches chemically to the available anionic charges of the soil and clay.

By this addition of calcium, all available charged sites on a soil or clay particle, both positive and negative are attachable by the composition. Thus, the calcium acts as a bridge between the PAM and the soil or clay.

Through empirical testing it has been found that the composition is functional through a broad range of percentages by weight of the various components.

In this respect, when the composition does not need to be of the pH balancing formula, it has been found to be effective with the components therein being present, by weight, 1% to 99% PAM; 1% to 99% aluminum chloral hydrate or aluminum oxide; with an amount of citric acid added thereto sufficient to produce solubility of the composition in water without stirring, typically in a range of between 0.01% and 20%.

Alternatively, when the composition must afford pH balancing for the environment, it has been found to be effective with the components therein being present, by weight, in the ranges of 1% to 99% calcium carbonate or calcium sulfate; 1% to 99% PAM; 1% to 99% aluminum chloral hydrate or aluminum oxide; with an amount of citric acid added thereto sufficient to produce solubility of the composition in water without stirring, typically in a range of between 0.01% and 20%.

The greatest effectivity of the composition for use when no pH balancing is required is obtained when formulated as approximately 49% PAM, approximately 49% aluminum chloral hydrate and approximately 2% citric acid by weight.

When pH balancing is required, the greatest effectivity of the composition is obtained when formulated as approximately 46% PAM, approximately 46% aluminum chloral hydrate, approximately 6% calcium carbonate or calcium sulfate and approximately 2% citric acid, by weight.

The composition has been found effective in water environments suspending various types of soil particles including: poorly graded sand, lean clay, silt, fat clay, elastic silt, silty gravel, clayey gravel, silty sand, clayey sand, organic clay, and organic silt.

As described above, the composition of the present invention provides a number of advantages, some of which have been described above and others of which are inherent in the invention. Also modifications to the composition may be proposed without departing from the teachings herein. Accordingly the scope of the invention is only to be limited as necessitated by the accompanying claims.

What is claimed is:

1. A composition for use in clarifying a body of water consisting essentially of at least one element selected from the group of calcium sulfate and calcium carbonate in the amount of 0% to 99% by weight of the composition; an anionic high molecular weight polyacrylamide having more than 100,000 monomer units per molecule in the amount of 1% to 99% by weight of the composition; citric acid in the amount of 0.01% to 20% by weight of the composition; and of at least one compound selected from the group of aluminum chloral hydrate and aluminum oxide in the amount of 1% to 99% by weight of the composition.

2. A composition for use in clarifying a body of water consisting essentially of 0% to 99% at least one element selected from the group of calcium sulfate and calcium carbonate by weight of the composition; 1.0% to 99% an anionic high molecular weight polyacrylamide having more than 100,000 monomer units per molecule by weight of the composition; 0.01% to 20% citric acid by weight of the composition; and 1% to 99% of at least one compound selected from the group of aluminum chloral hydrate and aluminum oxide by weight of the composition.

3. A composition for use in clarifying a body of water where no pH balancing is required consisting essentially of, by weight, 49% an anionic high molecular weight polyacrylamide having more than 100,000 monomer units per molecule; approximately 49% at least one compound selected from the group of aluminum chloral hydrate and aluminum oxide, and 2% citric acid.

4. A composition for use in clarifying a body of water where pH balancing is required consisting essentially of, by weight, 46% an anionic high molecular weight polyacrylamide having more than 100,000 monomer units per molecule, 46% at least one compound selected from the group of aluminum chloral hydrate and aluminum oxide, 6% of at least one compound selected from the group of calcium carbonate and calcium sulfate; and approximately 2% citric acid.

* * * * *